Patented Dec. 7, 1937

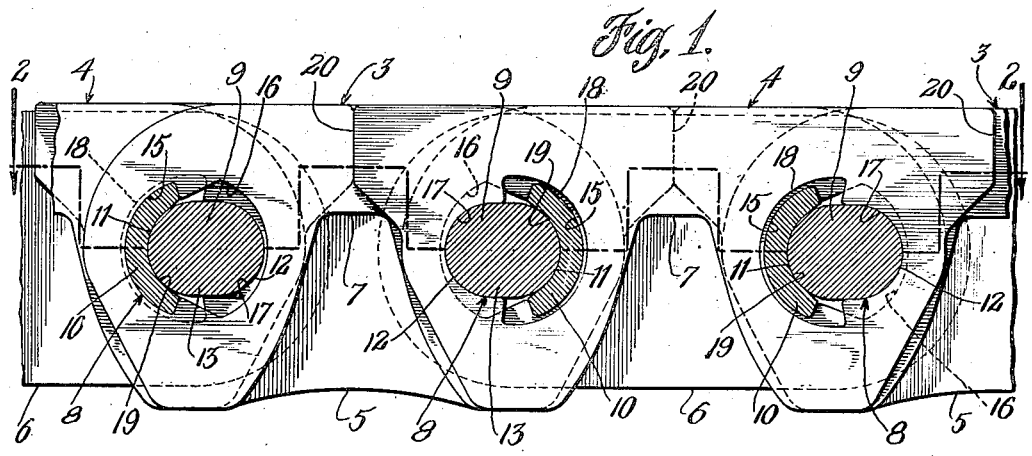

2,101,341

UNITED STATES PATENT OFFICE 2,101,341

DRIVE CHAIN

David Barnes Perry, Ithaca, N. Y., assignor to Morse Chain Company, Ithaca, N. Y., a corporation of New York Application October 25, 1935, Serial No. 46,669

4 Claims. (Cl. 74—255)

This invention relates to improvements in joints or pintles for drive chains and in particular to improvements in joints of the pin and bushing type. The objects and advantages of the invention will be clear from the following:

In drive chains having pin and bushing type of joints it has been customary to employ round or cylindrical pins and segmental bushings. In such chains, in order to maintain a correct pitch chain or to modify the pitch slightly to meet conditions in an engine design or similar mechanism in which the chain is employed, it is necessary to modify the joint sections or parts to lengthen or shorten the pitch as desired. It is pointed out, however, that if the bushing is made thicker or thinner in order to maintain or modify the chain pitch, then its inside curvature will no longer correspond to the curvature or radius of the pin with the result that the proper contacting relation between the pin and bushing cannot be maintained. This also results if the diameter of the round pin is increased or diminished to accomplish a change in pitch because then its curvature changes its relation to the concave curvature or surface of the bushing.

Through my invention I overcome the above difficulties and provide a chain in which the correct pitch may be readily maintained or modified to meet conditions in mechanism in which it is employed without destroying the proper contacting relation of the pintle parts.

To accomplish this, I employ a segmental bushing and a pin which in cross-section is oblong with rounded ends, the long dimension or major axis of which can be made greater or less to directly increase or diminish the pitch of the chain while maintaining the correct curvature of contact between the bushing and pin, as will be fully pointed out hereinafter.

How the foregoing, together with such other objects and advantages as may hereinafter appear, or are incident to my invention, are realized, is illustrated in preferred form in the accompanying drawing, wherein—

Figure 1 is a sectional elevation of a portion of a drive chain constructed in accordance with my invention, the section being taken substantially on the line 1—1 of Figure 2; and Figure 2 is a top plan view, partly in section, taken substantially on the line 2—2 of Figure 1.

The section of chain illustrated in the drawing comprises the links 3 and 4 each composed of a plurality of end and intermediate plates. The end plates 5 of the links 3 are in the form of guide plates and the end plates 6 of the links 4 are plain connecting plates, while the remaining intermediate plates 7 of both sets or links are of arch shape to provide tooth portions for engaging the teeth of sprocket wheels.

The joints or pintles 8 connecting the links 5 comprise a pin 9 and a segmental bushing 10, the pin being oblong with rounded ends in cross-section. The ends of the pin are indicated by the reference numerals 11 and 12 and the straight connecting portion by the numeral 13.

The end plates 6 of the links 4 are provided with apertures of the same shape as the pins and the pins are secured therein as by riveting over the ends of the pins as indicated at 14. It will be noted that the apertures are so disposed in the links that the major axis of the pin in cross-section extends in a direction lengthwise of the chain. The plates of the links 3 are provided with pintle receiving apertures which are configured at 15 so as to receive the bushings 10 and key them in place to turn with the links, while the remaining portion 16 of the apertures are configured to receive the pins 9 with clearance to permit of turning movement of the links 3 and their bushing with respect to the pins. The plates of the links 4 are provided with pintle receiving apertures which are configured at 17 so as to receive the pins 9 and key them in place to turn with the links while the remaining portion 18 of the apertures are configured to receive the bushings 10 with clearance to permit of turning movement of the links 4 and their pins with respect to the bushings 10.

It will be seen from the foregoing that, since the pins are keyed in the set of links 4 and the bushings in the set of links 3 and that since there is turning clearance between the links 3 and 4 and the pins and bushings, respectively, the turning movement when the chain bends takes place between the rounded ends or curved bearing surfaces 11 of the pins and the concave bearing surfaces 19 of the segmental bushings.

As has been pointed out above, the pins 9 are oblong in cross-section with rounded ends 11 and 12 which is very advantageous in maintaining a correct pitch chain or in modifying the pitch slightly to meet conditions in an engine design or similar mechanism in which the chain is employed for the reason that with pins of this cross-section it is possible to directly increase or diminish the pitch of the chain by employing pins which are shorter or longer in their long cross-sectional dimension or major axis, as the case may be, and this without altering the relation of the contacting curved bearing surfaces of the pins and bushings. Stated in another way, the major axis of the pin can be made more or less to take care of the pitch of the chain while the correct curvature of contact between the pin and bushing is maintained. As indicated at 6a in Figure 2, the major axis of the apertures in the end link plates 6 are slightly longer than the long axis of the pins normally employed in order to accommodate the largest pin section to be used when correcting or modifying the chain pitch. It is also to be noted that because of the oblong shape of the pin the supporting surfaces of the apertures in the links surround the pins to a greater degree and still allow for the necessary articulation of the bushing, i. e., the supporting surfaces of the apertures surround the pins more than 180° of the round ends of the pin.

The chain illustrated is of the non-back bend type, this being accomplished by providing extensions 20 on certain of the link plates which abut when the chain is in its straight run and which move away from each other when the chain bends in a direction around a sprocket wheel.

I claim:—

1. In a drive chain of the link type, the combination of overlapping links having pintle receiving apertures, pintle means in said apertures connecting the links and comprising pins oblong in cross-section with semi-circular end portions of like radius joined by a flattened portion, the flat surfaces of which merge with the rounded surfaces of said semi-circular portions, said pins being keyed in one set of links through the medium of said flattened portion with their long dimension extending lengthwise of the chain, and bushings keyed in the overlapping set of links and having concave bearing surfaces in which the adjacent convex end portions of the pins seat for turning movement, said apertures being configured to enable the turning movement.

2. A chain comprising overlapping links having aligned pintle receiving apertures, a pintle in said apertures, said pintle in cross-section being oblong with convex end portions of like radius connected by a central straight portion the straight surfaces of which merge with the rounded surfaces of said convex end portions, means engaging the straight surfaces of the pintle for keying it in one link with its long axis cross-sectionally considered extending in a direction lengthwise of the chain, and the other link having a concave bearing surface in turning contact with the adjacent convex end portion of the pintle.

3. A chain comprising overlapping links having aligned pintle receiving apertures, a pintle in said apertures, said pintle in cross-section being oblong with convex end portions of like radius connected by a central straight portion the straight surfaces of which merge with the rounded surfaces of said convex end portions, the aperture of one link having a concave portion of the same radius as the convex end portions of the pintle in which one convex end portion of the pintle seats and straight portions engaging the central straight portion of the pintle to key said link and pintle together, and the aperture of the other link having a convex bearing surface in turning contact with the other convex end portion of the pintle.

4. In a drive chain, the combination of links having apertures therein, and a joint for pairs of said links comprising a pin which in cross-section has semi-circular end portions of the same radius connected by a flat portion the flat surfaces of which merge tangentially with the curved surfaces of said semi-circular end portions, said flat surfaces constituting keying surfaces for keying the pin in one link to rotate therewith, and the connected link having a concave bearing surface corresponding in radius to the radius of the semi-circular portions of the pin, and said pin being disposed in the links with its major axis cross-sectionally considered extending in the direction of the major axes of the links.

DAVID B. PERRY.